United States Patent Office

3,562,385
Patented Feb. 9, 1971

3,562,385
DENTAL ANTIPLAQUE AND ANTICALCULUS COMPOSITIONS
Philip L. Block, New Brunswick, Eugene E. Howe, Somerset, and Myron J. Lover, Mountainside, N.J., assignors to Merck & Co., Inc., Rahway, N.J., a corporation of New Jersey
No Drawing. Filed Dec. 23, 1968, Ser. No. 786,868
Int. Cl. A61r 7/16
U.S. Cl. 424—54
5 Claims

ABSTRACT OF THE DISCLOSURE

Compositions for the removal of dental plaque and calculus containing combinations of one, two or three of the active agents: dextranase, 1,6-bis-(2-ethylhexylbiguanido)hexane dihydrochloride and sodium hexamethaphosphate together with or without added detergents, surfactants and antimicrobial ingredients.

---

This invention relates to compositions in the form of toothpastes, mouthwashes, lozenges, chewing gums, etc. and particularly to such preparations which are effective against both dental plaque and dental calculus. These compositions are effective in preventing the formation of and in removing dental plaque and calculus and they thereby reduce the incidence of caries and periodontal disease.

The initiation of the caries process is believed to be produced by the interplay of bacteria and a carbohydrate substrate in contact with a susceptible tooth surface. This interaction takes place within the dental plaque which is adherent to the tooth surface.

The cause of periodontal disease cannot be defined with an exactitude at the present time. The presence of calculus in all of the forms of periodontal pathology seems to indicate that calculus is a prime cause of the disease process. Removal of calculus deposits as part of periodontal therapy usually produces improvement of the clinical situation. Calculus does not only act as a mechanical irritant to the gingival tissues, with its superficial layer of bacterial plaque, it serves to extend the bacteria and their toxic products to the gingival and sulculus epithelium.

While there is much still to be learned about the mechanisms of calculus formations, enough is known to construct the basic sequence of events.

The first step is the deposition of a soft plaque on the tooth surface. Most of the plaque consists of dead and living bacteria surrounded by a gel-like organic matrix derived from the bacteria and saliva. Inorganic components from saliva and bacteria are also present within the plaque. It has been shown recently that the bacteria in the plaque utilizes sucrose to form extracellular dextran and levan which, together with salivary mucoproteins, forms a "biological glue" that cements the bacteria and other particulate matter to the tooth surface.

The plaque appears as a whitish, glistening or dull mat on tooth surfaces. It is not soluble in water and acts as an effective diffusion barrier between the salivary buffers and the tooth surface. After ingesting sucrose, the pH of the plaque drops to about 5 and is maintained at that level for some time. This low pH probably produces the initial decalcification of the tooth surface in the process of caries development.

In the second phase, the plaque undergoes gradual calcification to form dental calculus. It is not known what initiates this calcification process. Bacteria must play a role in some way since conventional animals form much more calculus than their germ-free counterparts. When calcification of plaque occurs, it begins within and between the bacteria. Many foci of calcification begins within the plaque and with time, these foci coalesce.

Pharmacologic agents that would remove plaque and calculus or prevent their formation would be of tremendous significance in the prophylaxis and treatment of caries and periodontal disease. These agents would have even more value in a wide-based dental health program for the public at large. While it would not eliminate the need for complete dental care, it would help fill the unmet dental health needs of our rapidly expanding population.

The removal and prevention of dental plaque, and calculus appears to be the most important means, at present, of preventing or aborting the progress of dental caries and periodontal disease.

Agents which would accomplish plaque and calculus removal would have to do the following:
(a) Alter the nature of the plaque (the bacteria and/or intermicrobial matrix).
(b) Alter the ability of the organic matrix to attach itself to the tooth.

In accordance with the present invention there is incorporated into the composition to be brought into contact with the teeth, the bis-biguanido compound, 1,6-bis-(2-ethylhexylbiguanido)hexane dihydrochloride having the formula

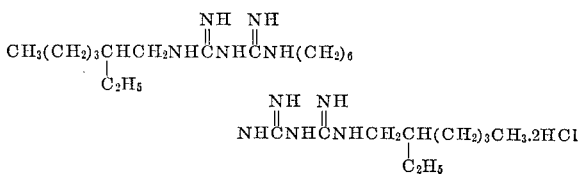

This compound is available from the Sterling-Winthrop Company or it can be made by known chemical processes. It is added to toothpastes, tooth powders, tooth ointments, mouthwashes, troches, lozenges, chewing gums, foods, drinks, etc. so as to contitute from 0.001% to 0.1% by weight of the composition and preferably 0.001% to 0.01%. It can, of course, be applied directly to the teeth and gums in the amount of 0.005 mg. to 0.5 mg. per application by rubbing it on with a finger. The compound should be in contact with the teeth and gums for at least half a minute but preferably for 2 to 3 minutes, at least 2 to 3 times per day.

Representative formulations are the following:

EXAMPLE I

A typical chewing gum may have the following formulation, by weight:

| | Percent |
|---|---|
| Gum base | 20–50 |
| Glucose | 10–20 |
| Bis-biguanido compound | 0.01 |
| Sweetening and flavoring | Remainder |

This gum would be masticated as though it did not contain the medicinal agent.

EXAMPLE II

A typical toothpaste may have the following formulation, by weight:

| | Percent |
|---|---|
| Polishing and abrasive agents | 40–60 |
| Excipients | 20–30 |
| Modifiers (thickness) | 0.5–3 |
| Detergents | 0.5–5 |
| Water | 10–20 |
| Bis-biguanido compound | 0.01 |
| Sweetening and flavoring agents | Remainder |

It is preferable for the mouth not to be thoroughly rinsed out with water after using the toothpaste. This toothpaste may, of course, be rubbed on the teeth and gums and consequently other unctuous preparations may be substituted, such as conventional ointments, salves, and lotions. They are obvious from this Example II.

EXAMPLE III

A typical mouthwash may have the following formulation, by weight

| | Percent (approximate) |
|---|---|
| Potassium bicarbonate | 2 |
| Sodium borate | 2 |
| Thymol | 0.05 |
| Eucalyptol | 0.1 |
| Methyl salicylate | 0.05 |
| Amarcenth solution | 1.4 |
| Glycerin | 10 |
| Alcohol | 5 |
| Bis-biquanido compound | 0.01 |
| Water | Remainder |

The mouth should not be rinsed out with water afterward.

EXAMPLE IV

A typical tooth powder may have the following formulation, by weight

| | Percent (approximate) |
|---|---|
| Hard soap | 5 |
| Precipitated calcium carbonate | 93 |
| Sodium saccharin | 0.2 |
| Peppermint oil | 0.4 |
| Cinnamon oil | 0.2 |
| Methyl salicylate | 0.8 |
| Bis-biguanido compound | 0.01 |
| Water | Remainder |

EXAMPLE V

To the water to be supplied to an apparatus which delivers it at high velocity in a fine stream is added about 0.01% by weight of the bis-biguanido compound. From this it is apparent that beverages and foods can have this same amount of active ingredients added to them. Beverages especially are useful for this purpose as they are often sipped over long periods and this will maintain the combination of active ingredients in the mouth for appreciable periods. Solid foods that should be chewed for a long time, such as breads may have the active agents added to them, e.g. from 0.001% to 0.1% by weight of the bis-biguanido compound.

In the above examples, the amount of the bis-biguanido compound can be reduced or enlarged within the range of 0.001% to 0.1%.

EXAMPLE VI

As mentioned above, from 0.005 mg. to 0.5 mg. of the bis-biguanido compound is placed on a finger or on a tooth brush and applied to the tooth and gum surface for from one-half to three or more minutes, at least 2 to 3 times per day.

The invention also contemplates the combination with the bis-biguanido compound of other agents known to be effective in the prophylactic and therapeutic treatment of dental plaque. In particular, the invention includes the addition in the above example of from 0.0001% to 1.0% of the enzyme known as dextranase. Also, the invention includes the addition in the above examples of from 0.1% to 40.0% of sodium hexametaphosphate sold under the trademark Calgon, this addition being with and without the additional presence of the dextranase and/or the bis-guanido compound. If desired, a surfactant may be added to wet the plaque and cause deeper penetration of the antiplaque agents.

EXAMPLE VII

A representative example of a composite formulation is a tooth powder having the formulation:

| | Percent |
|---|---|
| Hard soap | 5 |
| Precipitated calcium carbonate | 50–93 |
| Bis-biguanido compound | 0.001–0.1 |
| Sodium hexametaphosphate | 0.1–40.0 |
| Dextranase | 0.0001–1.0 |
| Flavoring agents | Remainder |

Other examples of composite formulations are those in which any one of the active ingredients of Example VII is omitted leaving the other two in the preparation. Moreover, dextranase and/or sodium hexametaphosphate may be added to the compositions of Examples I to VI in the amounts set forth above.

The use of dextranase to treat dental plaque is disclosed in an article entitled, "The effects of dextranase preparation on plaque and caries in hamsters, a preliminary report," by Robert J. Fitzgerald et al., in the J. Am. Dental Assn., vol. 76, No. 2, February 1968, pages 301–304.

The use of Calgon to treat dental plaque and calculus deposits is disclosed in an article entitled "Hexametaphosphate [Calgon] an Aid in the Prevention and Treatment of Periodontal Disease," appearing in the University of Michigan School of Dentistry Alumni Bulletin, August 1946.

What is claimed is:

1. An oral composition for suppressing dental plaque and calculus formation, comprising a carrier to be taken into the mouth and maintained in contact with the teeth and incorporated therewith from 0.001–1% 1,6-bis-(2-ethylhexylbiguanido)hexane dihydrochloride.

2. The preparation according to claim 1 in which the carrier is a toothpaste.

3. The preparation according to claim 1 in which the carrier is a tooth powder.

4. The preparation according to claim 1 in which the carrier is a mouthwash.

5. The method for suppressing dental plaque formation, comprising applying to the teeth and gums from 0.005 mg. to 0.5 mg. of 1,6-bis(2-ethylhexylbiguanido)hexane dihydrochloride.

References Cited

UNITED STATES PATENTS

| | | | |
|---|---|---|---|
| 3,152,181 | 10/1964 | Shapiro et al. | 424—52 |
| 3,183,230 | 5/1965 | Shapiro et al. | 424—54 |
| 3,342,687 | 9/1967 | Gould | 424—326 |

FOREIGN PATENTS

| | | |
|---|---|---|
| 1,463,818 | 11/1966 | France. |

OTHER REFERENCES

McNamara et al., J. Soc. Cosmetic Chemists, vol. 16, pp. 499–506, 1965.

RICHARD L. HUFF, Primary Examiner

U.S. Cl. X.R.

424—50, 57